United States Patent [19]

Alten

[11] Patent Number: 4,770,522
[45] Date of Patent: Sep. 13, 1988

[54] AUTOMOBILE MIRROR POSITION SENSOR AND ADJUSTER ASSEMBLY

[75] Inventor: Ralph W. Alten, Arnold, Mo.

[73] Assignee: Siegel-Robert, Inc., St. Louis, Mo.

[21] Appl. No.: 115,717

[22] Filed: Nov. 2, 1987

[51] Int. Cl.$^4$ .......................... G02B 7/18; G05B 19/42
[52] U.S. Cl. .................................... 350/633; 248/485; 350/637
[58] Field of Search .............. 350/279, 280, 281, 282, 350/283, 632, 633, 634, 635, 636, 637; 248/481, 482, 483, 484, 485, 486, 487

[56] References Cited

U.S. PATENT DOCUMENTS

| | | | |
|---|---|---|---|
| 4,267,494 | 5/1981 | Matsuoka et al. | 350/637 |
| 4,449,788 | 5/1984 | Suzuki | 350/637 |
| 4,504,117 | 3/1985 | Mittelhauser | 350/636 |
| 4,625,329 | 11/1986 | Ishikawa et al. | 350/637 |
| 4,678,295 | 7/1987 | Fisher | 350/634 |

Primary Examiner—John K. Corbin
Assistant Examiner—Martin Lerner
Attorney, Agent, or Firm—Rogers, Howell, Moore & Haferkamp

[57] ABSTRACT

A sensing and adjustment assembly for a mirror on automobiles has a sensor comprising an electronic oscillator which is associated with a mirror position indicator member. Movement and position of the mirror is detected by the sensor. A driving arrangement responds to the sensor to move the mirror to a preset position which position is stored in a computer memory. The oscillator can have a winding of spiral shape and the indicator can comprise material capable of absorbing electromagnetic energy, such as steel, and can be of substantially tapered shape such as substantially conical. The member can be moved through a center passageway for the winding. The oscillator can be a Colpitts or other type. A differential amplifier, a converter from A.C. to D.C., and another amplifier can be part of the sensor. A pair of sensors and indicators can be used in conjunction with the drive means to move the mirror in two planes. The mirror positions can be stored in computer memory in correlation with the selected seat positions of a plurality of passengers, and the computer connected with the assembly and seat system, so that when the seat is moved to a preset position, the mirror is also moved to a preset position that permits the passenger to have proper viewing through the mirror.

31 Claims, 3 Drawing Sheets

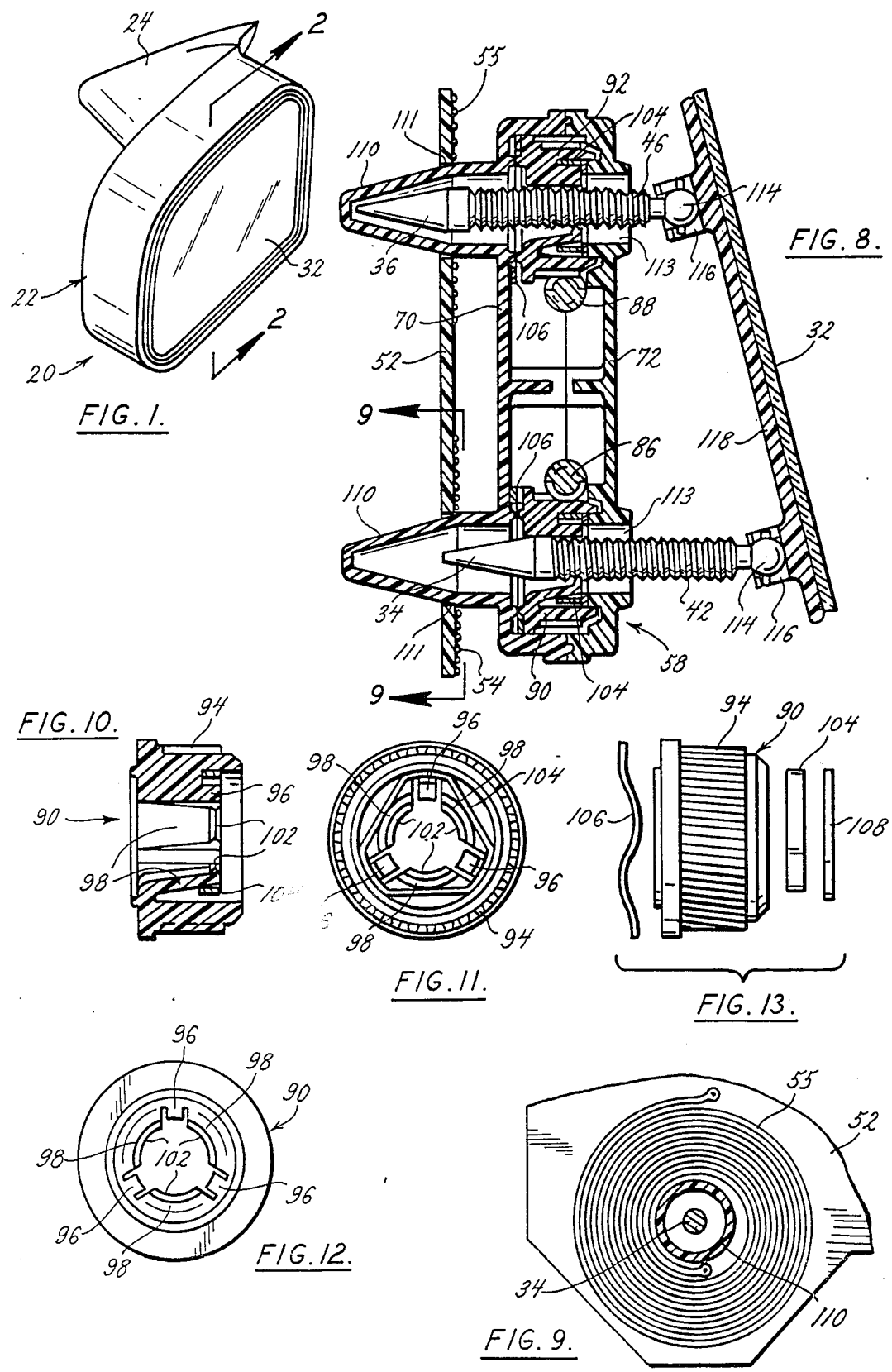

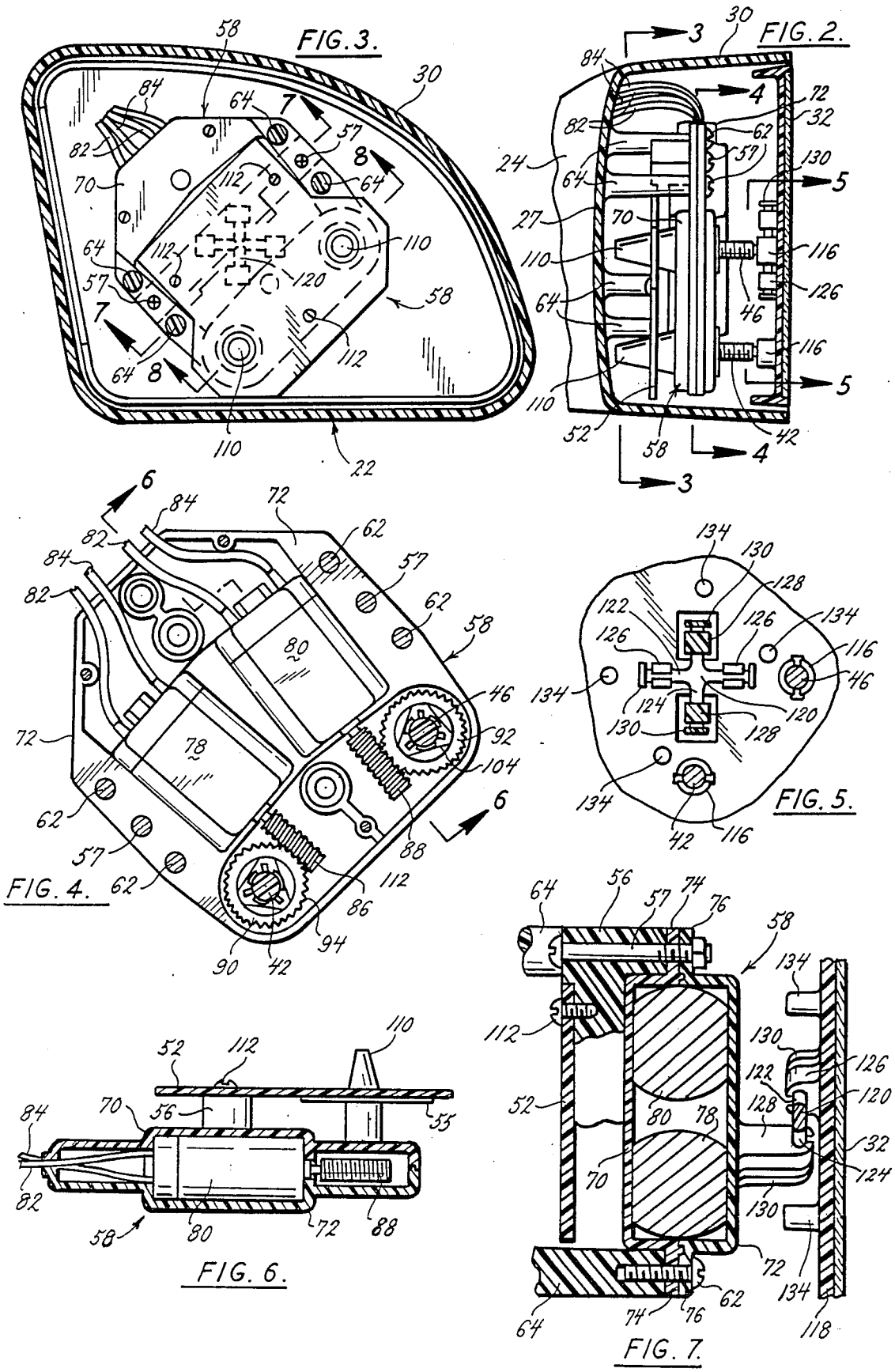

AUTOMOBILE MIRROR POSITION SENSOR AND ADJUSTER ASSEMBLY

BACKGROUND AND SUMMARY OF THE INVENTION

Electrically operated remote controlled rear view mirrors mounted on either the left or right side of a vehicle are an accessory found on automobiles. In the typical arrangement, a mirror is mounted on a support member which is pivotally mounted on a base member or housing. The housing is in turn mounted on either the left or right side of the automobile. The support member moves relative to the housing in the horizontal and/or vertical directions. Extending between the housing and the support member are a pair of linkages for pivoting the support member. A pair of reversible driving motors are mounted on the base member and each motor actuates one of the linkages. The motors are controlled by a switch operated by the driver. Examples of this type of remote controlled mirror are disclosed in U.S. Pat. Nos. 3,609,014 and 4,611,401.

Even though electrically operated remote controlled rear view mirrors are convenient, it is more desirable to be able to program a computer or computer module to remember a preset position of the mirror for each driver. The position sensor system for controlling the position of the mirrors is typically used in conjunction with a system for controlling the position of a driver's seat. Upon pressing a single button, a driver may automatically reposition the driver's seat as well as both the left and right outside rearview mirrors. Position information for the seat and both mirrors are programmed into the computer module.

In order to be able to program in memory the position of the mirror there must be a mechanism for sensing the position of the mirror along the horizontal and vertical axes. Presently, mirrors use linear motion potentiometers for determining the position of the mirror. The potentiometers are linearly displaced by the motion of the mirror in either the horizontal or vertical planes. A fixed voltage is impressed across the potentiometer and a portion of the voltage is tapped off by a sliding member of the linear motion potentiometer to be used as an input signal. This input signal is sent to a computer where it is processed and stored. The level of the input signal corresponds to the physical position of the mirror.

These potentiometers have been troublesome in that they are subject to mechanical wear, subject to mechanical failure of the slider contact due to contaxination from salt, dirt, and dust, and are expensive to replace. Potentiometers, because of their mechanical nature, may suffer from poor resolution and backlash. This can lead to improper mirror positioning.

To solve these and other problems, the inventor herein has succeeded in replacing the linear motion potentiometers with electronic position sensors which have no moving parts in contact with one another, are not subject to mechanical wear, and are not subject to contamination due to salt, dust, or dirt. The invention includes a means for indicating the position of the mirror relative to its mount comprising a member associated with the mirror, combined with means to sense the member's position comprising an inductive winding, or an oscillator. The invention is illustrated by providing an assembly with electronic sensors each comprising an inductance coil into which is inserted a tapered steel rod. The coil can be part of a Colpitts oscillator. When the steel rod moves through the coil it absorbs energy at a varying rate, causing the A.C. output voltage of the oscillator to change in relation to the position of the tapered rod in the oscillator coil. This output voltage is amplified, converted to a D.C. voltage signal, amplified again, and then outputted to the computer. Drive means responsive to the indicating and sensing means moves the mirror to its position.

The following set forth objects of one or more of the claims for the invention. It is an object to provide an assembly to adjust the position of a mirror of an automobile to selected preset positions relative to the mount for the mirror by a member which is associated with the mirror and is electromagnetically associated with a sensor.

It is further an object to provide a means for sensing the position of the member relative to the mirror mount. Furthermore, it is an object to provide a means for indicating and sensing the mirror position comprising an oscillator and an indicator member, with means for electromagnetically controlling the electrical output of the oscillator upon movement of the indicator member. It is further an object to provide a means for sensing the position of the member which comprises an inductive winding electrically associated with the member.

An objective as well is to provide a drive means responsive to the indicator and sensor means, which moves the mirror to the desired position.

An additional object is to provide an assembly with a position indicator comprising a member capable of absorbing electromagnetic energy. Moreover an object is to provide such a member which has a varying cross section.

Further an objective is to provide such an adjustment assembly wherein the means for indicating the position of the mirror is a rod comprising metal having a longitudinal taper, and wherein the sensing means is an inductive winding positioned so that the metal rod can be moved to be surrounded by the winding. It is an object to have the tapered part of the rod to be of a substantially conical shape.

Another object is to provide a means of generating a voltage or signal output in such a system which is a mathematical function of the position, or of the travel, of the member and which thus acts as a position sensor.

Still another objective is to provide an electromagnetic sensor using an oscillator and a differential amplifier means, and a means for converting from alternating current to direct current.

It is moreover an object to provide such an automotive position sensor which does not employ linear potentiometers.

Yet another object is to provide an automotive position or travel sensor which minimizes problems caused by frictional wear, and which resists failure caused by contamination from salt, dirt, or dust.

Another object is to provide such an adjustment and positioning assembly which eliminates inaccuracy due to noise and interference which is present with potentiometers used for such positioning and adjustment.

It is further an object to provide proper resolution of an image in a mirror which has its position adjusted on an automotive vehicle.

Yet another object is to provide a position or travel sensor comprising a self-excited electronic L-C oscillator which features a flat spiral wound inductive coil as a component of the resonant tank circuit, into the center axis of which is inserted a steel rod, the shape of which determines the position output function.

An objective is to provide a position sensor which when used in pairs can position an automotive rear view mirror in each of two planes and provide voltage outputs that are proportional to the mirror surface position.

It is furthermore an object to provide a position sensor for an automobile mirror which can be used with a computer memory seat system to control the portion of the seats and of the mirror.

BRIEF DESCRIPTION OF THE DRAWINGS

FIG. 1 is an isometric view of the main housing, the mount, and the mirror for the assembly;

FIG. 2 is a section taken on the line 2—2 of FIG. 1, which breaks open the main housing to view the interior thereof;

FIG. 3 is a section taken on the line 3—3 of FIG. 2;

FIG. 4 is a section taken on the line 4—4 of FIG. 2;

FIG. 5 is a section taken on the line 5—5 of FIG. 2;

FIG. 6 is a section taken on the line 6—6 of FIG. 4;

FIG. 7 is a section taken on the line 7—7 of FIG. 3;

FIG. 8 is a section taken on the line 8—8 of FIG. 3 showing parts of the assembly with some parts not shown for clarity, and with the indicator rods shown in different positions relative to the sensing windings;

FIG. 9 is a plan view showing a substantially flat inductive winding taken on the line 9—9 of FIG. 8;

FIG. 10 is a section through one of the drive gears for an indicator rod;

FIG. 11 is a front plan view of such a drive gear for an indicator rod;

FIG. 12 is a rear plan view of such a drive gear for an indicator rod;

FIG. 13 is an exploded side plan view of such a drive gear for an indicator rod;

GENERAL DESCRIPTION OF PREFERRED EMBODIMENT

Figure 14:
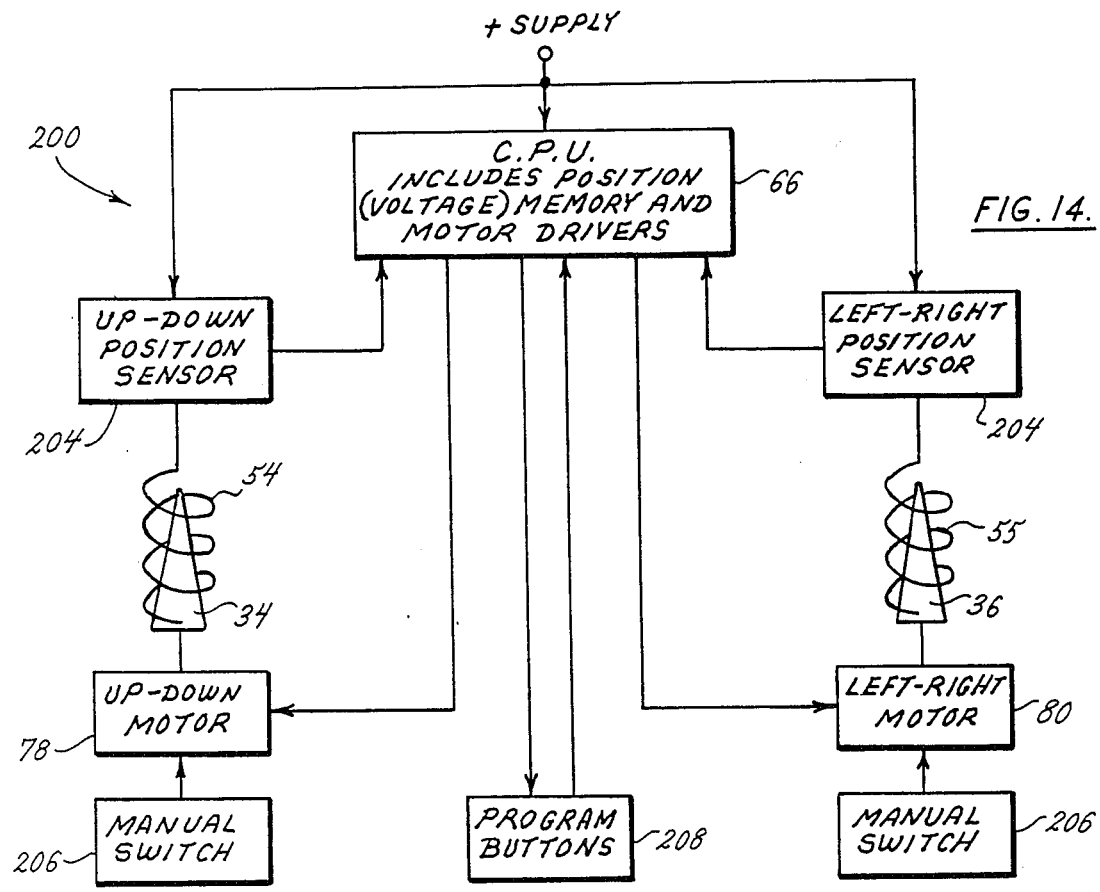
FIG. 14 is a schematic block diagram of the computer with which the assembly can be used, and certain control elements for the computer and of the adjustment assembly.

First, reference is made to FIGS. 1-13 which show the physical assembly 20 and components thereof.

Generally, FIGS. 1-13 show a housing 22 with a standard support brace 24 for attachment to an automobile door (not shown). The housing 22 has a back wall 27 and a surrounding side wall 30. A mirror 32 is mounted facing outwardly from the rear of housing 22.

The assembly 20 further includes a means for indicating the position of the mirror 32 relative to the housing mount 24 and housing 22, as well as a means for sensing the position indicated for the mirror 32. The indicating means comprises rods 34 and 36 of varying cross section, shown as substantially tapered steel rods of conical shape. Rods 34 and 36 are firmly secured to screw shafts 42 and 46, respectively. Shafts 42 and 46 may be of plastic with cylindrical projections that are press fit within conforming bores of rods 34 and 36.

The sensing means comprises a circuit board 52, with a pair of windings shown as flat spiral coils 54 and 55 mounted thereto. The board 52 is mounted in fixed position, as by a C-shaped mount block 56 held by screws and nuts 57 to a motorpack housing 58. Motor housing 58 is in turn mounted in fixed relationship to housing 22 as by four screws 62 threaded into four sleeves 64 that are integral with the back wall 27 of mirror housing 22. The sensing means and indicating means further include circuitry shown in FIGS. 14 and 15. The indicating means and sensing means interact with other elements so that a means to adjust the mirror 32 to preset positions is provided. The mirror 32 positioning can be correlated to correspond to the position of a seat (not shown) within the automobile, by means including a computer module 66 for processing and storing the output from the sensing means shown in FIG. 14. The preset mirror 32 and seat positions stored in memory can be activated to move both the mirror 32 and seat so that the seat occupant has the mirror 32 positioned for proper selected position when the preset mirror 32 and seat positions are reached.

SPECIFIC DESCRIPTION OF PREFERRED EMBODIMENT

The motorpack housing 58 has two halves 70 and 72, each having side flanges 74 and 76 through which screws 62 pass to secure the halves together. Each half 70 and 72 has a pair of cavities which are aligned to receive motors 78 and 80, each motor having a pair of conducting wires 82 and 84 connected as known in the art. Motors 78 and 80 are connected to drive worm gears 86 and 88, respectively. Worms 86 and 88 drivingly mesh with rotary gerrs 90 and 92, which all fit within another pair of matching cavities of housing halves 70 and 72. Gears 90 and 92 are preferably of molded plastic. As seen specifically in FIGS. 10-13 for gear 90, each gear 90 and 92 has an outer teethed wall 94, spaced from an inner triad of axially extending, narrow, centering flutes 96 and wider prongs 98. Prongs 98 each have inwardly projecting flanges 102. Flanges 102 act together as threads to drivingly fit with the threads of indicator shafts 42 and 46. A metal brace 104 reinforces gear wall 94. A sinusoidal annular shock absorbing ring 106 and resilient washer 108 fit on either side of gear 90 against the housing halves 70 and 72, respectively.

Figure 15:
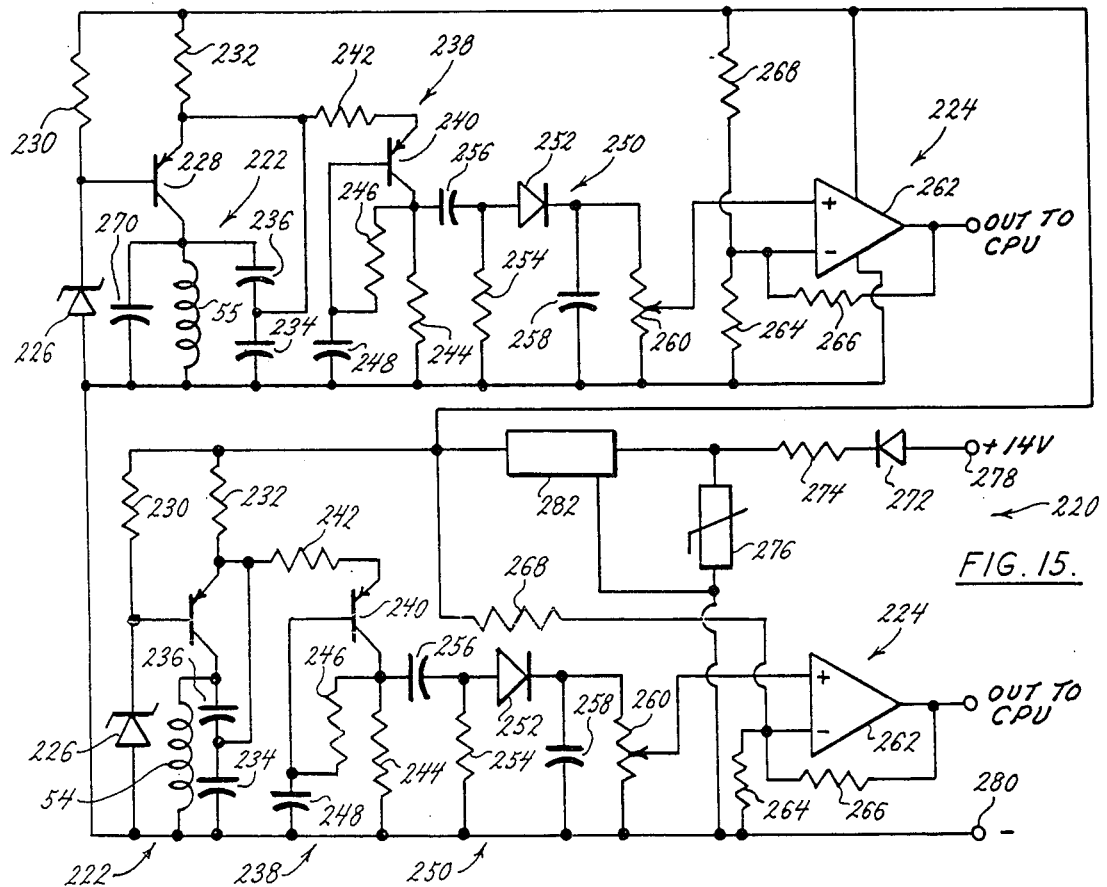
FIG. 15 is a schematic of the circuitry for the adjustment assembly.

Housing half 70 has integral projecting covers 110 shaped to conform to rods 34 and 36 to allow movement of those rods therein. Circuit board 52 has a pair of holes 111 sized to receive covers 110. The circuitry elements shown in FIG. 15 are mounted to board 52 by known means. Prior to mounting, the circuitry on board 52 is coated with a substance, such as polyurethane conformal coating, by dipping the circuit board assembly into such substance, to protect the circuitry from the environment, such as salt, water, dust and the like. Board 52 is firmly held to C block 56 by screws 112. On the opposite side, housing half 72 has openings 113 to receive the threaded shafts 42 and 46. Each shaft 42 and 46 terminates into a ball 114 which fits into socket sleeves 116 that are integral with the mount plate 118 to which mirror 32 is secured by known means. A cross shaped gimbal 120 has a pair of aligned arms 122 and 124 which snap-fit into slots of knobs 126 projecting from plate 118 and into slots of knobs 128 projecting from housing half 72. Stop plates 130 projecting from plate 118 and housing half 72 abut the ends of arms 122 and 124. This gimbal assembly allows for stable movement of mirror 32 in two planes relative to housing 22.

There are four cylindrical stops 134 projecting integrally from the back of mount plate 118 (FIGS. 5 and 7). These stops 134 act to contact motorpack housing half 72 to limit mirror angular travel in each of two lanes, as known in the art.

As seen in FIG. 3, motor housing 58 is mounted angularly to main housing 22 so that rod 36 and its shaft 46 and the corresponding structure about them are mounted above and to the right (viewed looking at FIG. 3) of rod 34 and shaft 46 and their surrounding structure.

As the motors 78 and 80 drive worms 86 and 88 in either direction, the gears 92 and 94 are likewise driven in the corresponding direction. As gears 92 and 94 rotate, the inner gear prongs 98 rotate, and their thread flanges 102 screw along threaded shafts 42 and 46. Thus, for example, as gear 90 is driven in a first direction, threaded shaft 42 screws toward motor housing 58, while when gear 90 is driven in the second direction, shaft 42 screws away from housing 58. The same is true for shaft 46 rotation. The flexible prongs 98 of the gears 90 and 92 allow the gears 90 and 92 to free wheel and avoid lock up and motor damage when the stops 134 contact motor housing half 72 to limit mirror 32 movement. The prongs 98 also permit manual adjustment of mirror 32 by hand pressing the mirror. The shafts 42 and 46 rotations, through the ball and socket connections 114 and 116, thus selectively move the mirror 32 in two planes. These planes, X and Y, commonly define mirror 32 movement in the rp and down direction (Y plane) and the left ro right direction (X plane).

As each rod 34 and 36 move through their circuit board 52 holes, the thickness of the tapered rod 34 and 36 sections which lie in the same plane as coils 54 and 55 vary. For example, in FIG. 8, the thickness of tapered rod 34 intersected by the plane of coil 54 is much smaller than the thickness of the tapered rod 36 intersected by the plane of coil 55, due to difference between the relative positions of rods 34 and 36 to board 52. The change in such rod thickness in the planes of coils 54 and 55 permits energy to be absorbed at varying rates as the tapered rods 34 and 36 move through coils 54 and 55.

This variance in energy absorption causes the A.C. output voltage of the coils 54 and 56 to change in relation to the position of the tapered rods 34 and 36 to their respective coils 54 and 55.

The rods 34 and 36 can also be of an exponential or asymptotic taper, or other taper.

Turning now to the schematic drawings, FIG. 14 shows a simplified block diagram of the mirror position sensor system 200 of the present invention is illustrated. The principal elements of the system 200 include the computer module 66 for processing and storing the output from a pair of position sensors 204. The computer module 66 is connected to the pair of motors 78 and 80. The motors 78 and 80 are controlled either by manual switches 206 or by a signal sent from the computer module 66 in response to depression of a program button 208. The screw shafts are shown by elements 42 and 46, which are driven by the motors 78 and 80, have the tapered rods 34 and 36 extending respectively from one end thereof. Rods 34 and 36 are electro-magnetically coupled to each of the position sensors 204. The position of the rods 34 and 36 within the coils 54 and 55 of the sensors 204 determines the level of the signal which is sent to the computer module 66. The coils 54 and 55 are as mentioned, preferably of substantially flat spiral shape, but for illustrative purposes, are shown differently in the FIG. 14 schematic. The value of the signal corresponds to the position of the shafts 42 and 46, and accordingly, to mirror 32. Program buttons 208 are connected to the computer module 66 to initiate the memory function of the computer module 66.

The foregoing has been a funttional description of a block diagram which explains the operation of the mirror position sensor system 200 and the sensors 204 of the present invention. A detailed circuit diagram 220 of the sensors 204 is illustrated in FIG. 15, and its principal components will be explained and identified to further enable one of ordinary skill in the art to make and use the invention.

Referring to FIG. 15, there is illustrated the detailed wiring diagram 220 of the electric circuitry for sensing the position of the mirror 32 in the X and Y planes. The portion of this circuit which senses the position of the mirror 32 in the Y plane will now be described. To sense the position of the mirror, a Colpitts oscillator 222 has the tapered steel rod 34 inserted through oscillator coil 54. The Colpitts oscillator 222 is the preferred oscillator. However other oscillators such as a Hartley or Armstrong oscillator may also be used. Movement of the rod 34 through the coil 54 changes the magnitude of the A.C. output voltage from the oscillator 222. This output is amplified and converted to a D.C. signal which is applied to the input of a difference amplifier circuit 224. The output signal from the difference amplifier circuit 224 is connected to the computer module of FIG. 14 for processing and storing the signal.

The Colpitts oscillator 222 comprises an oscillator coil 54, a zener diode 226, a transistor 228 such as type number MPS 2907, a 1.5k ohm resistor 230, a 560 ohm resistor 232, a 0.1 microfarad capacitor 234, and a 0.047 microfarad capacitor 236. The oscillator 222 is connected to a grounded base amplifier circuit 238. The grounded base amplifier circuit 238 includes a transistor 240 of the same type number as transistor 228, a 47 ohm resistor 242, a 3.9k ohm resistor 244, a 330k ohm resistor 246, and a 0.01 microfarad capacitor 248. The signal from the amplifier circuit 238 is inputted into an A.C. to D.C. converter circuit 250. This converter circuit 250 has a diode 252 such as type number 1N914, a 22k ohm resistor 254, a 0.01 microfarad capacitor 256, a 0.001 microfarad capacitor 258, and a 20k ohm adjustable potentiometer 260 as its components. The difference amplifier circuit 224 receives the D.C. signal from the converter circuit 250. The difference amplifier circuit 224 comprises an operational amplifier 262 such as type number TL092, a 10k ohm resistor 264, a 240k ohm resistor 266, and a 390k ohm resistor 268.

The same numerals used to describe the circuitry for the y plane are used to reference components cf the x plane circuitry except the oscillator coil of the x plane circuitry is numbered 55. The electronic circuitry for sensing the position of the mirror in the x plane includes the same components as the aforesaid circuitry for the y plane, except the x plane circuitry further includes a 0.005 microfarad capacitor 270 in parallel with the oscillator coil 55 of the Colpitts oscillator 222. This capacitor 270 shifts one oscillator frequency relative to the other oscillator to prevent the two oscillators 222 from locking together at the same frequency. If the two oscillators 222 were able to oscillate at the same frequency, they would interfere with each other, which is not desired. This capacitor 270 can be connected in parallel with either of the oscillator coils 54 or 55.

There are some components which are common to both the x plane and the y plane sensor circuits. A diode 272 such as type number 1N4004 and a 47 ohm half watt resistor 274 in series with the diode 272, protect against reverse polarity. A varistor 276 such as type number V22ZA05 is connected across the plus 278 and minus 280 terminals of the circuit 220 to protect against transient voltages. A voltage regulator 282 such as type number MC78L08 is also included in the circuit 220 to insure that the correct voltage is applied to the circuit 220, and to stabilize the oscillator 222 output.

Programming the computer module 66 to store the desired positions of the seat and the mirror 32 is accomplished in the following manner. The user first moves the seat and the mirror 32 to the desired position by using a manual seat control to move the seat and a manual mirror control to move the mirrors. At this point the user will depress a SET button which is located near the manual controls. Pressing the SET button will initiate the program mode of the computer module. The position of the seat and the mirror 32 will now be placed in the memory of the computer module 66. A pair of buttons marked MEM 1 and MEM 2 correspond to two memory locations in the computer module 66 for storing two different positions of the seat and the mirror 32. By pressing either the MEM 1 or MEM 2 button the positions at which the seat and the mirror 32 are at that particular time will be stored in the memory of the computer module 66. A second set of seat and mirror 32 positions may be programmed in the computer module 66 for use by another driver. To reposition the seat and the mirror 32 to the position stored in the first memory location the user only needs to press the MEM 1 button and the seat and mirror 32 will automatically adjust to that position unless they are already there. The assembly can be used with the mirrors of various automobile vehicles including cars, trucks and vans.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. An assembly for adjusting the position of a mirror of an automobile to selected preset positions relative to a mount for the mirror, comprising:
    (a) means for indicating the position of the mirror relative to the mount, comprising a member associated with the mirror; and
    (b) means for sensing the position of the member relative to the mount, comprising an inductive winding electromagnetically associated with the member.

2. The assembly of claim 1 further comprising means for providing a computer having memory means, and wherein the indicating means indicates the position of the mirror to the computer memory means.

3. The assembly of claim 2 wherein in the preamble the assembly is further for use with a computer memory for sensing the position of an automobile seat; and wherein the indication means is correlated to the seat position stored in the computer memory.

4. The assembly of claim 1 wherein the member is capable of absorbing electromagnetic energy and comprises a part of varying cross-section.

5. The assembly of claim 4 wherein the part of varying cross-section is of a substantially tapered shape.

6. The assembly of claim 5 wherein the substantially tapered shape is a substantially conical shape.

7. The assembly of claim 4 wherein the member comprises metal.

8. The assembly of claim 1 wherein the inductive winding is comprised of a substantially flat spiral coil.

9. The assembly of claim 1 wherein the member is connected to the mirror, wherein the inductive winding is in fixed position relative to the mount, and wherein the winding has a passageway extending through the winding sized to permit the member to be moved through the passageway of the winding.

10. The assembly of claim 1 wherein the sensing means comprises a Colpitts oscillator.

11. The assembly of claim 10 wherein the sensing means comprises differential amplifier means, and means for converting from alternating current to direct current.

12. The assembly of claim 1 further comprising means for adjusting the position of the mirror relative to the mirror mount according to a selection of a preset mirror position relative to the mount, comprising drive means responsive to the indicating and sensing means to move the mirror relative to the mount to a preset mirror position.

13. An assembly for adjusting the position of a mirror of an automobile to selected preset positions relative to a mount for the mirror, which positions are stored in the memory of a computer, comprising:
    (a) means for indicating to the memory the position of the mirror relevant to the mount, comprising a rod mounted to move with the mirror, the rod comprising material capable of absorbing electromagnetic energy and having a part thereof which is of substantially tapered shape; and
    (b) means for sensing the position of the rod relative to the mount, comprising an oscillator having a substantially flat spiral coil, means for amplifying, means for converting alternating current to direct current; and
    (c) means for adjusting the position of the mirror relative to the mirror mount according to a selection of a preset mirror position relative to the mount, comprising drive means responsive to the indicating and sensing means to move the mirror relative to the mount to a preset mirror position.

14. An assembly for adjusting the position of a mirror of an automobile to selected preset positions relative to a mount for the mirror, comprising:
    (a) means for indicating the position of the mirror relative to the mount, comprising a pair of members associated with the mirror to move with mirror movement relative to the mount, each member having means for absorbing electromagnetic energy; and
    (b) means for sensing the position of each of the members relative to the mount comprising two inductive windings, one each of said windings being electromagnetically associated with a corresponding indicator member, each winding having a passageway extending through the winding sized to permit the indicator member to be moved through the winding passageway, and each winding comprising a substantially flat spiral coil; and
    (c) means for connecting the members to the mirror, and to the mount for the mirror, so that the movement of the members relative to the mirror mount permits movement of the mirror relative to the mount in two planes.

15. The assembly of claim 14 wherein each of the members is a rod comprising steel having a substartially tapered shape, and wherein the indicating means further comprises a drive shaft connected to each of the rods.

16. The assembly of claim 15 wherein in the preamble the assembly is further for use with a computer memory for sensing the position of an automobile seat and wherein the indication means is correlated to the seat position stored in the computer memory, and further comprising means for adjusting the position of the mirror relative to the mirror mount according to preset mirror positions which correspond to preset seat positions.

17. An assembly for adjusting the position of a mirror of an automobile to selected preset positions relative to a mount for the mirror, comprising:
 (a) means for indicating the position of the mirror relative to the mount, comprising a member associated with the mirror;
 (b) means for sensing the position of the member relative to the mount, comprising an oscillator; and
 (c) means for electromagnetically controlling the electrical output of the oscillator upon movement of the member.

18. The assembly of claim 17 wherein the member is capable of absorbing electromagnetic energy.

19. The assembly of claim 17 wherein in the preamble the assembly is further for use with a computer memory for sensing the position of an automobile seat; and wherein the indication means is correlated to the seat position stored in the computer memory.

20. An assembly for adjusting the position of a mirror of an automobile to selected preset positions relative to a mount for the mirror, comprising:
 (a) means for indicating the position of the mirror relative to the mount, comprising a member connected to the mirror, the member being capable of absorbing electromagnetic energy;
 (b) means for sensing the position of the member relative to the mount, comprising an inductive winding electromagnetically associated with the member, the winding having a passageway extending through it to permit the member to be moved through the passageway.

21. The assembly of claim 20 wherein the member has a part of varying cross-section, wherein the inductive winding is in fixed position relative to the mount; means for adjusting the position of the mirror relative to the mirror mount according to the selection of a preset mirror position relative to the mount, comprising drive means responsive to the indicating and sensing means to move the mirror relative to the mount to a preset mirror position.

22. The assembly of claim 20 wherein in the preamble the assembly is further for use with a computer memory for sensing the position of an automobile seat; and wherein the indication means is correlated to the seat position stored in the computer memory.

23. An assembly for adjusting the position of a mirror of an automobile to selected preset postions relative to a mount for the mirror, comprising:
 (a) means for indicating the position of the mirror relative to the mount, comprising a first member associated with the mirror; and
 (b) means for sensing the position of the first member relative to the mount, comprising a second member having a magnetic field, so that different positions of the first member relative to the second member causes a variation in the strength of the magnetic field of the second member.

24. The assembly of claim 23 further comprising means for providing a computer having memory means, and wherein the indicating means indicates the position of the mirror to the computer memory means.

25. The assembly of claim 23 wherein the sensing means further comprises an amplifier, and means to provide a direct current output signal.

26. The assembly of claim 23 wherein the member comprises a part of varying cross-section.

27. The assembly of claim 26 wherein the part of varying cross-section is of substantially tapered shape.

28. The assembly of claim 27:
 (a) further comprising means for adjusting the position of the mirror relative to the mirror mount according to the selection of a preset mirror position relative to the mount, comprising drive means responsive to the indicating and sensing means to move the mirror relative to the mount to a preset mirror position; and
 (b) wherein the first member comprises steel.

29. The assembly of claim 23 wherein in the preamble the assembly is further for use with a computer memory for sensing the position of an automobile seat; and wherein the indication means is correlated to the seat position stored in the computer memory.

30. An assembly for adjusting the position of a mirror of an automobile to selected preset positions relative to a mount for the mirror, comprising:
 (a) means for indicating the position of the mirror relative to the mount, comprising a first pair of members associated with the mirror to move with the mirror movement relative to the mount, each member having means for absorbing electromagnetic energy and having a substantially tapered shape; and
 (b) means for sensing the position of the first members comprising a second pair of members each having a magnetic field and correlated to interact with each of the respective first pair of members so that different positions of each of the first members relative to its corresponding second member causes a variation in the strength of the magnetic field of each corresponding second member.

31. The assembly of claim 30 wherein the means for sensing comprises each of the second pair of members including an inductive winding electromagnetically associated with its corresponding first member, each winding having a passageway extending through it to permit the corresponding first member to be moved through the corresponding passageway.

* * * * *